United States Patent [19]
Tarumi et al.

[11] Patent Number: 5,145,805
[45] Date of Patent: Sep. 8, 1992

[54] GLASS COMPOSITIONS

[75] Inventors: Takashi Tarumi, Kawachinagano; Toshihiko Einishi, Ikoma, both of Japan

[73] Assignee: Isuzu Glass Co., Ltd., Osaka, Japan

[21] Appl. No.: 744,143

[22] Filed: Aug. 13, 1991

Related U.S. Application Data

[62] Division of Ser. No. 680,965, Apr. 5, 1991.

[30] Foreign Application Priority Data

Apr. 10, 1990 [JP] Japan .................................. 2-95917
Aug. 20, 1990 [JP] Japan ................................ 2-219630
Mar. 4, 1991 [JP] Japan ................................. 3-123243

[51] Int. Cl.$^5$ ................................................ C03C 3/64
[52] U.S. Cl. ........................................ 501/78; 501/27; 501/73; 501/905
[58] Field of Search .................. 501/21, 30, 27, 78, 501/905, 56, 28, 73

[56] References Cited

U.S. PATENT DOCUMENTS

| | | | |
|---|---|---|---|
| 2,651,145 | 7/1950 | Stookey | 65/63 |
| 4,106,946 | 8/1978 | Ritze | 501/70 X |
| 4,222,781 | 9/1980 | Morse et al. | 501/13 |
| 4,297,142 | 10/1981 | Ritze | 501/78 X |
| 4,303,298 | 12/1981 | Yamashita | 501/73 X |
| 4,374,931 | 2/1983 | Courbin et al. | 501/13 |
| 4,556,605 | 12/1985 | Mogami et al. | 428/331 |
| 5,024,974 | 6/1991 | Nakamura et al. | 501/32 X |

FOREIGN PATENT DOCUMENTS 321297 6/1971 European Pat. Off. .
46-3464 1/1971 Japan .
1089067 4/1984 U.S.S.R. .

OTHER PUBLICATIONS

Skoog and West, *Fundamentals of Analytical Chemistry* (2nd. ed. 1969) pp. 634 and 640.
Stanworth, Journal of the Society of Glass Technology, vol. 25, pp. 95–99 (1941).
Weyl, Coloured Glasses, pp. 433–435 (1951).

*Primary Examiner*—William R. Dixon, Jr.
*Assistant Examiner*—Lisa M. Schull
*Attorney, Agent, or Firm*—Armstrong & Kubovcik

[57] ABSTRACT

The invention provides:
(1) a glass composition comprising about 20 to about 85% of $SiO_2$, about 2 to about 75% of $B_2O_3$, 15% or less of $Al_2O_3$, about 30% or less of at least one of $Li_2O$, $Na_2O$, $K_2O$, $Rb_2O$ and $Cs_2O$, about 10% or less of at least one of MgO, CaO, ZnO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide; and
(2) a glass composition comprising about 8 to about 25% of $SiO_2$, about 5 to about 35% of $P_2O_5$, about 30% or less of $B_2O_3$, about 10 to about 35% of $Al_2O_3$, about 5 to about 20% of at least one of $Li_2O$, $Na_2O$, $K_2O$, $Rb_2O$ and $Cs_2O$, about 20% or less of at least one of MgO, CaO, ZnO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide.

4 Claims, 5 Drawing Sheets

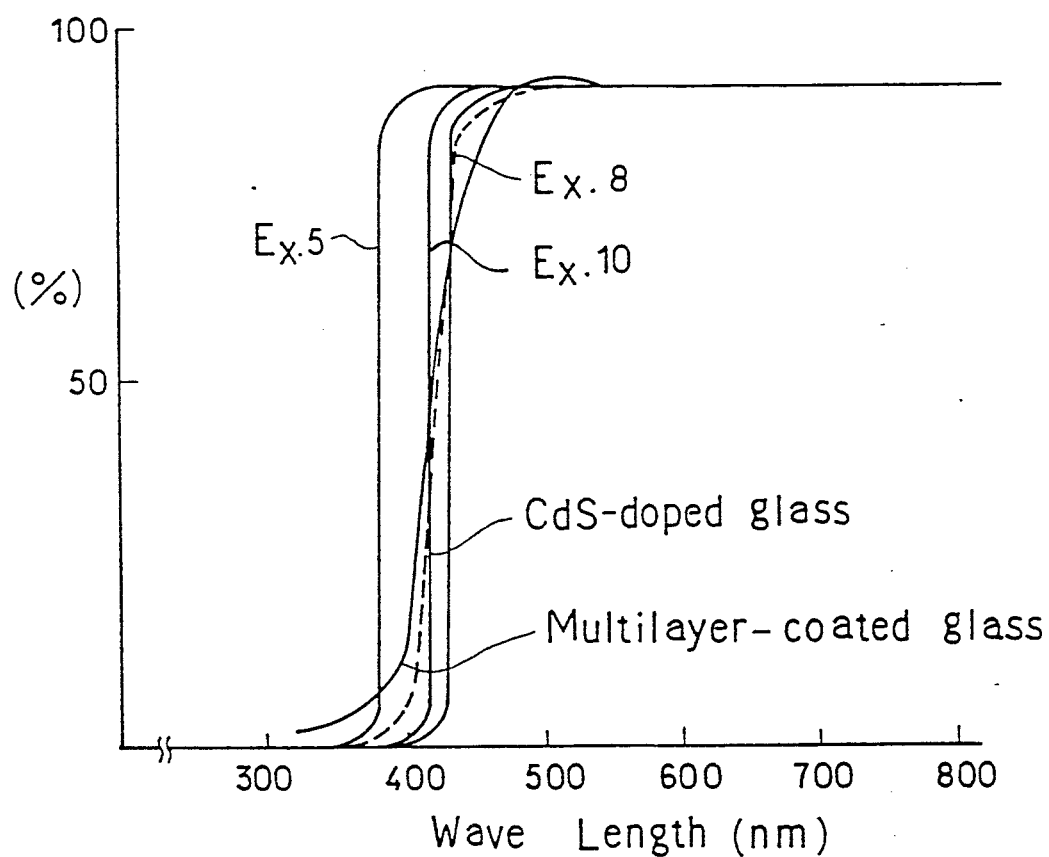

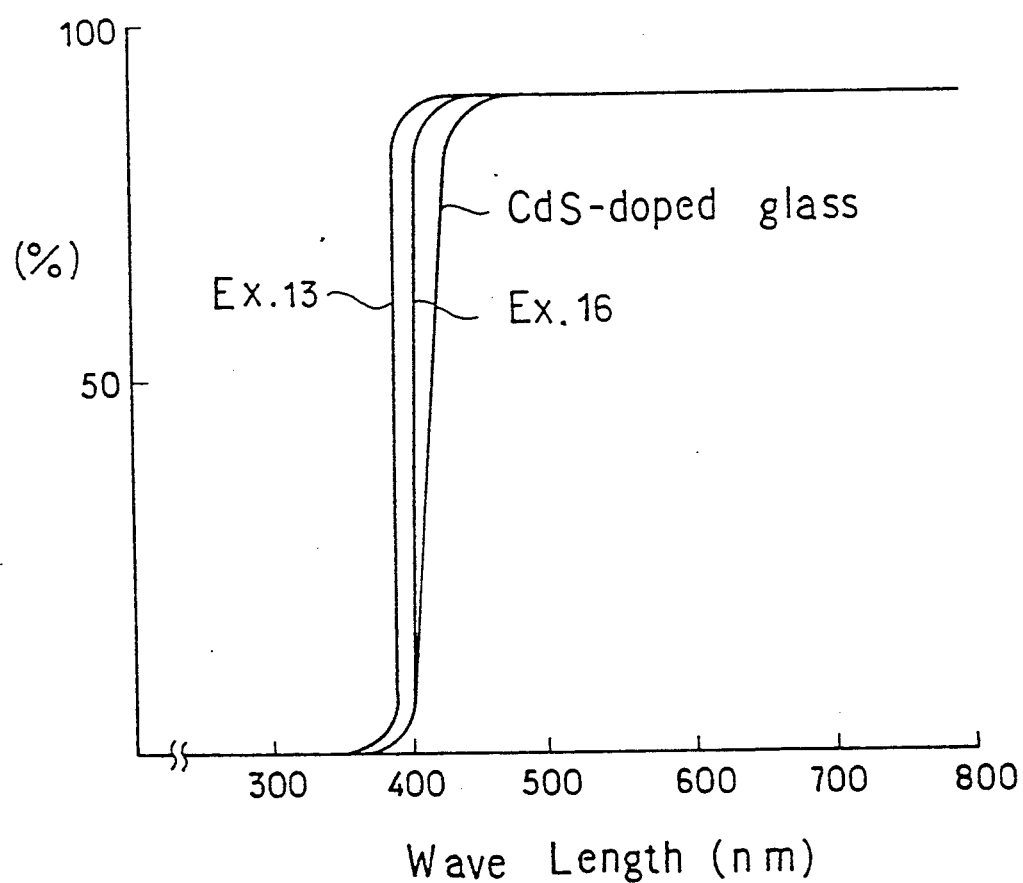

GLASS COMPOSITIONS

This is a division of application Ser. No. 07/680,965 filed Apr. 5, 1991 pending.

BACKGROUND OF THE INVENTION

The present invention relates to glass compositions for use as materials capable of intercepting ultraviolet radiation.

The percentages (%) appearing herein are all by weight unless otherwise specified.

Colored glass has been used as a material capable of absorbing light beams in ultraviolet or visible region, e.g., as a material for sharp cut glass filters on cameras. Such colored glass is produced by doping a glass material with microcrystals of semiconductor compounds which pertain to II-VI groups such as CdS, CdSe, CdSSe and the like. The microcrystals of semiconductor can intercept ultraviolet radiation by absorbing light beams at a specific wavelength passing through colored glass.

However, the foregoing cadmium compounds are toxic and cause health hazards to operators carrying out a producing process including preparation of a batch, transport, melting, etc. Moreover, it is difficult to dispose of the Cd compounds in the effluents and waste resulting from cutting, grinding, polishing and other processing, and consequently pollution problems are likely to occur. To avoid pollution, the contents of Cd and like compounds in waste water, are limited, for example, to 0.1 mg/l under the Water Pollution Control Law in Japan. For the above reasons, the production of colored glass requires a number of installations including equipment for treatment to control pollution, equipment for the disposal of sludge, etc. and therefore the Cd compound-doped glass is not an industrially suitable material.

The glass materials doped with microcrystals of CdS, CdSe, CdSSe or like compounds show a gradual inclination in a graph ($\Delta\lambda$) according to JIS B 7113 indicating the light transmittance plotted as ordinate and the wavelength plotted as abscissa (see, for example, FIGS. 2-4 attached hereto) and can not achieve a high absorption of light.

Multilayer-coated glass is used for similar applications. This type of glass is produced by vapor deposition of multilayer film on a glass product incapable of absorbing light beams in ultraviolet or visible region and is intended to intercept light beams in a specific wavelength range by utilizing the interference of light beams in between the multilayers. Multilayer-coated glass, however, has an intercepting effect which depends on the angle of incidence. More specifically multilayer-coated glass is capable of intercepting light beams of specific wavelength which are incident in a specific direction, but is incapable of shutting off light beams which are incident in other directions. In addition, multilayer-coated glass shows a gradual inclination in the graph under JIS B 7113 and can not give a high intercepting effect.

SUMMARY OF THE INVENTION

We conducted extensive research to prepare from glass a novel ultraviolet light-intercepting material having a higher effect without use of Cd compounds and other harmful substances which entail the foregoing problems in producing colored glass. Our research revealed that a glass composition prepared by doping a glass material with microcrystals of copper halides, i.e. semiconductor compounds of I-VII groups, can substantially completely interrupt the light beams in a specific wavelength range, permits the light beams of longer wavelength to pass therethrough, shows a sharp inclination in the graph under JIS B 7113 and has an excellent absorbing characteristic. The present invention has been accomplished based on this novel finding.

According to the present invention, there are provided:

(1) a glass composition comprising about 20 to about 85% of $SiO_2$, about 2 to about 75% of $B_2O_3$, 15% or less of $Al_2O_3$, about 30% or less of at least one of $Li_2O$, $Na_2O$, $K_2O$, $Rb_2O$ and $Cs_2O$, about 10% or less of at least one of MgO, CaO, ZnO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide (hereinafter referred to as "Invention 1"), and (2) a glass composition comprising about 8 to about 25% of $SiO_2$, about 5 to about 35% of $P_2O_5$, about 30% or less of $B_2O_3$, about 10 to about 35% of $Al_2O_3$, about 5 to about 20% of at least one of $Li_2O$, $Na_2O$, $K_2O$, $Rb_2O$ and $Cs_2O$, about 20% or less of at least one of MgO, CaO, ZnO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide (hereinafter referred to as "Invention 2").

The glass compositions of Inventions 1 and 2 which are produced by doping a mixture of specific glass components with microcrystals of at least one copper halide allow the selective passage of light beams at a specific wavelength therethrough and can achieve the desired effect due to coloring. Even when intensively irradiated with UV beams, the glass compositions of the invention do not undergo the change of color and can retain the inherent light transmitting characteristic.

BRIEF DESCRIPTION OF THE DRAWINGS

In the accompanying drawings;

FIG. 6 shows the variation in graphs of light transmitting characteristics of UV-intercepting materials prepared in Examples and conventional UV-intercepting materials for comparative purpose; and FIG. 7 represents the variation in graphs of light transmitting characteristics of UV-intercepting materials prepared in Examples and conventional UV-intercepting materials for comparative purpose.

DETAILED DESCRIPTION OF THE INVENTION

Figure 1:
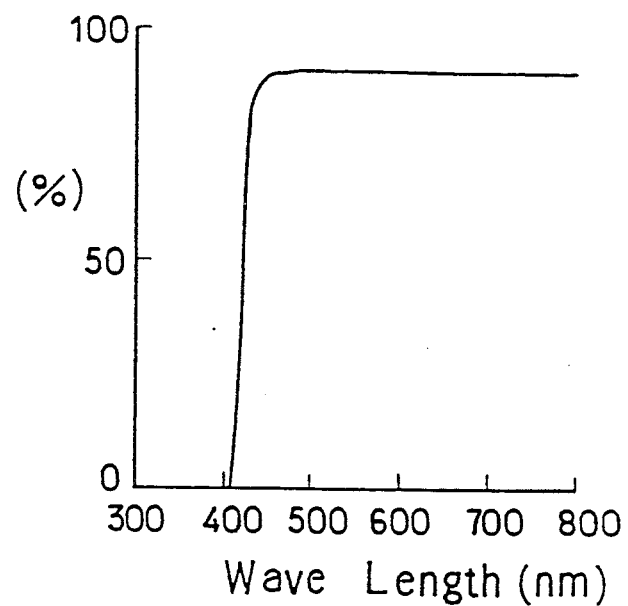
FIG. 1 is a graph showing the variation of light transmitting characteristic of one example of UV-intercepting materials according to the invention.

Among the components of glass compositions of the invention, the components other than the copper halides constituting the major feature of the invention are selected from the compounds heretofore employed for conventional glass products.

Stated more specifically, in preparation of the glass composition of Invention 1, the components other than the copper halides are selected from the following compounds heretofore used as glass components and combined in a specific ratio:

$SiO_2$, $B_2O_3$, $Al_2O_3$, $Li_2O$, $Na_2O$, $K_2O$, $Rb_2O$, $Cs_2O$, MgO, CaO, ZnO, BaO, SrO, PbO, $ZrO_2$, $La_2O_3$, $Y_2O_3$, $Ta_2O_3$ and $Gd_2O_3$.

In preparation of the glass composition of Invention 2, the components other than the copper halides are selected from the following compounds heretofore used as glass components and combined in a specific ratio:

$SiO_2$, $B_2O_3$, $P_2O_5$, $Al_2O_3$, $Li_2O$, $Na_2O$, $K_2O$, $Rb_2O$, $Cs_2O$, MgO, CaO, ZnO, BaO, SrO, PbO, $ZrO_2$, $La_2O_3$, $Y_2O_3$, $Ta_2O_3$ and $Gd_2O_3$.

As a matter of course, the components in a multi-component composition affect each other to achieve the properties. Therefore the discussion of quantity range of each component in a multi-component composition may not necessarily be meaningful. None the less, we discuss below the reasons for determining the amounts of components as specified above in the glass compositions of Inventions 1 and 2.

(I) Invention 1

Among the components of the glass composition of Invention 1, $SiO_2$ is a main component for forming the network and accounts for about 20 to about 85%, preferably about 50 to about 71%, of the total components. The proportion of $SiO_2$ outside the above range is undesirable because the content of more than 85% impairs the fusing property of glass, whereas the content of less than 20% imparts a poor chemical resistance which may give rise to change of color.

$B_2O_3$ serves to enhance the fusing property of glass, and can be a network-former in a certain composition. This component accounts for about .2 to about 75%, preferably about 12 to about 27%, of the total components. The content of more than 75% reduces the chemical resistance of glass, whereas the content of less than 2% gives a poor light transmittance and a deteriorated fusing property to glass.

$Al_2O_3$ inhibits devitrification and improves the chemical resistance of glass. The compound accounts for about 15% or less, preferably about I to about 10%, of the total components. The content of more than 15% pronouncedly decreases the fusing property of glass.

$Li_2O$, $Na_2O$ and $K_2O$, and $Rb_2O$ and $Cs_2O$ enhance the fusing property of glass. They are usable singly or at least two of them can be used in mixture. The amount is about 30% or less, preferably about 5 to about 15%, based on the total components. The content of more than 30% lowers the chemical resistance of glass.

MgO, CaO, ZnO, BaO, SrO and PbO improve the chemical resistance of glass. They are usable singly or at least two of them can be used in mixture. The amount is about 10% or less, preferably about 5% or less, more preferably about 0.1 to about 5%, based on the total components. The content of more than 10% impairs the fusing property of glass.

$ZrO_2$, $La_2O_3$, $Y_2O_3$, $Ta_2O_3$ and $Gd_2O_3$ enhance the chemical resistance of glass. They are usable singly or at least two of them can be used in mixture. The amount is about 10% or less, preferably about 5% or less, more preferably about 0.1 to about 3%, based on the total components. The content of more than 10% induces increased devitrification, thereby adversely affecting the stability of glass.

Copper halides useful in Invention 1 include, for example, CuCl, CuBr, CuI, etc. At least one of these halides is used for doping the glass. The copper halides act as a coloring agent which absorbs light beams of a specific wavelength in ultraviolet or visible region. The copper halide is used in an amount of about 0.05 to about 15%, preferably about 0.3 to about 8%, based on the total components. The glass compositions containing the copper halide in said quantity range can substantially completely intercept light beams at any wavelength within the range of about 350 to about 450 nm, permit light beams of longer wavelength to substantially completely pass therethrough, and show a sharp inclination in the graph under JIS B 7113 and an outstanding light transmitting characteristic. The content of copper halide outside the foregoing range is undesirable because the content of less than 0.05% fails to achieve the foregoing desired effect, whereas the content of more than 15% causes devitrification.

(II) Invention 2

Among the components of the glass composition of Invention 2, $SiO_2$ is a main component for forming the network and accounts for about 8 to about 25%, preferably about 10 to about 20%, of the total components. The content of more than 25% impairs the fusing property of glass, whereas the content of less than 8% imparts a poor chemical resistance which may lead to change of color.

$P_2O_5$ is also a main component for forming the network and is used in an amount of about 5 to about 35%, preferably about 10 to about 30%, based on the total components. The contents of less than 5% and over 35% fail to produce a colored glass product having the desired light transmittance.

$B_2O_3$ improves mainly the fusing property of glass, and is used in an amount of about 30% or less, preferably about 10 to about 25%, based on the total components. The content exceeding 30% deteriorates the chemical resistance of glass.

$Al_2O_3$ inhibits devitrification and improves the chemical resistance of glass also in Invention 2. The compound accounts for about 10 to about 35%, preferably about 15 to about 25%, of the total components. The content of more than 35% decreases the fusing property of glass, whereas the content of less than 10% lowers the chemical resistance of glass.

$Li_2O$, $Na_2O$ and $K_2O$, and $Rb_2O$ and $Cs_2O$ enhance the fusing property of glass. They are usable singly or at least two of them can be used in mixture. The amount is about 5 to about 20%, preferably about 5 to about 15%, based on the total components. The content of more than 20% reduces the chemical resistance of glass, whereas the content of less than 5% diminishes the fusing property of glass.

MgO, CaO, ZnO, BaO, SrO and PbO improve the chemical resistance of glass. They are usable singly or at least two of them can be used in mixture. The amount is about 20% or less, preferably about 5% or less, more preferably about 0.1 to about 5%, based on the total components. The content of more than 20% impairs the fusing property of glass.

$ZrO_2$, $La_2O_3$, $Y_2O_3$, $Ta_2O_3$ and $Gd_2O_3$ enhance the chemical resistance of glass. They are usable singly or at least two of them can be used in mixture. The amount is about 10% or less, preferably about 5% or less, more preferably about 0.1 to about 3%, based on the total components. The content of more than 10% increases devitrification, thereby adversely affecting the stability of glass.

Copper, halides useful in Invention 2 include, for example CuCl CuBr, CuI, etc. As described hereinbefore, at least one of these halides is used for doping the glass. The copper halides act as a coloring agent which absorbs light beams of specific wavelength in ultraviolet or visible region. The copper halide is used in an amount of about 0.05 to about 15%, preferably about 0.3 to about 8%, based on the total components. The glass compositions containing the copper halide in said quantity range can substantially completely intercept light beams at any wavelength within the range of about 350 to about 450 nm, permit light beams of longer wavelength to substantially completely pass therethrough, and show a sharp inclination in the graph under JIS B 7113 and an outstanding light transmitting characteristic. The content of the halide outside the foregoing range is undesirable because the content of less than 0.05% fails to achieve the desired effect, whereas the content of more than 15% causes devitrification.

The glass compositions of the present invention can be used for the following specific applications.

(1) Materials for Masking in an Apparatus for Curing Ultraviolet-Curing Resins

A ultraviolet-curing resin is cured by irradiation with high-energy ultraviolet beams from a light source such as a high pressure mercury lamp, a metal halide lamp or the like. High-energy ultraviolet radiation which is indispensable to cure UV-curing resins is undesirable in terms of assured safety of operators, prevention of deterioration of equipment, etc. The UV-intercepting materials of the present invention are useful, for example, as materials for glass plates in a monitoring window provided in a resin-curing apparatus, as materials for glass plates for protection of parts of such apparatus against degradation, as materials for glass plates adapted to selectively pass UV beams radiated from a light source at a wavelength suited for curing a specific resin while shutting off UV beams at a wavelength outside the range.

The glass plates composed of Uv-intercepting materials of the invention have preferably the following compositions:

(i) Invention 1

About 55 to about 75% of $SiO_2$, about 12 to about 30% of $B_2O_3$, about 1 to about 10% of $Al_2O_3$, about 5 to about 15% of at least one of $Li_2O$, $Na_2O$, $K_2O$, $Rb_2O$ and $Cs_2O$, about 5% or less of at least one of MgO, CaO, ZnO, BaO, SrO and PbO, about 5% or less of at least one of $ZrO_2$, $La_2O_3$, $Y_2O_3$, $Ta_2O_3$ and $Gd_2O_3$, and about 0.3 to about 8% of at least one copper halide; and (ii) Invention 2

About 10 to about 20% of $SiO_2$, about 10 to about 30% of $P_2O_5$, about 10 to about 25% of $B_2O_3$, about 15 to about 25% of $Al_2O_3$, about 5 to about 15% of at least one of $Li_2O$, $Na_2O$, $K_2O$, $Rb_2O$ and $Cs_2O$, about 5% or less of at least one of MgO, CaO, ZnO, BaO, SrO and PbO, about 5% or less of at least one of $ZrO_2$, $La_2O_3$, $Y_2O_3$, $Ta_2O_3$ and $Gd_2O_3$, and about 0.3 to about 8% of at least one copper halide.

(2) Glass Products for Protection of Artistic Handicrafts, etc.

Float glass has been used, for example, for show windows and display stands in artistic handicraft stores, quality clothes stores, etc. and as windowpanes in laboratories, automobiles and so on. However, float glass is unable to intercept UV beams in the sunlight, and therefore fails to prevent the color fading and degradation of artistic handicrafts, the discoloration and deterioration of clothes, the adverse influence on research results, the quality change and impairments of interior parts in automobiles, etc. Furthermore, the float glass used in automobiles is problematic in that drivers in automobiles are susceptible to eye disorders due to ultraviolet radiation and dermatitis due to sunburn.

The UV-intercepting materials of the invention effectively interrupt UV beams in the sunlight and permit visible radiation to selectively pass therethrough, as described above. Consequently the UV-intercepting materials of the invention can alleviate or obviate the foregoing problems, and are useful as glass materials for protecting articles in a wide range of fields.

The glass products for the above applications have preferably the same compositions as described above in (1).

(3) Materials for Optical Filters or for Spectacle Lenses

Optical glass filters have been used for optical instruments such as cameras. Currently there is a demand for novel materials for filters which can interrupt UV radiation more effectively to form a sharper image.

Similarly in the art of spectacles, a demand exists for materials which can intercept UV radiation sufficiently to protect the eyes with a higher effect.

The UV-intercepting materials of the invention, which can effectively intercept ultraviolet beams and allow the selective passage of visible radiation therethrough, are suitable as materials for optical glass filters and for spectacle lenses.

It is more preferred that the materials for optical glass filters and for spectacle lenses according to Inventions 1 and 2 have the same compositions as described above in (1).

(4) Materials for Containers

Since pharmaceutical preparations, alcohols, beverages, etc. tend to undergo the change of properties by exposure to UV radiation, they are frequently accommodated in containers of colored glass (such as brown glass or emerald green glass). However, conventional colored glass adapted to fully interrupt UV radiation notably shuts off visible radiation, thereby making it difficult to mechanically or visually inspect the contents of the container.

Because of their ability to effectively intercept UV radiation while permitting selective passage of visible radiation therethrough, the UV-intercepting materials of the invention are suitable as materials for containers intended to hold the contents which require inspection.

According to B-155-5 (method of testing glass containers for injectable preparations) in Japanese Pharmacopoeia, the containers are required to have a light transmittance of 50% or less at a wavelength of 290 to 450 nm or 60% or more at 590 to 610 nm as determined by the method of testing containers of colored glass for the light barrier property. The UV-intercepting materials of the invention can fully meet the requirements.

The materials for containers in this technical area have preferably the following compositions:

(i) Invention 1

About 60 to about 77% of $SiO_2$, about 10 to about 20% of $B_2O_3$, about 1 to about 12% of $Al_2O_3$, about 5 to about 10% of at least one of $Li_2O$, $Na_2O$, $K_2O$, $Rb_2O$ and $Cs_2O$, about 8% or less of at least one of MgO, CaO, ZnO, BaO, SrO and PbO, about 8% or less of at least one of $ZrO_2$, $La_2O_3$, $Y_2O_3$, $Ta_2O_3$ and $Gd_2O_3$, and about 0.3 to about 8% of at least one copper halide; and (ii) Invention 2

About 15 to about 20% of $SiO_2$, about 15 to about 25% of $P_2O_5$, about 5 to about 20% of $B_2O_3$, about 20 to about 30% of $Al_2O_3$, about 5 to about 15% of at least one of $Li_2O$, $Na_2O$, $K_2O$, $Rb_2O$, and $Cs_2O$, about 8% or less of at least one of MgO, CaO, ZnO, BaO, SrO and PbO, about 8% or less of at least one of $ZrO_2$, $La_2O_3$, $Y_2O_3$, $Ta_2O_3$ and $Gd_2O_3$, and about 0.3 to about 8% of at least one copper halide.

(5) Powdery Materials for UV Absorption

The UV-intercepting materials of the invention capable of effectively intercepting UV radiation may be incorporated in the form of particles of about 1 to about 10 μm in size into a resin composition, a coating composition or the like to improve the weatherability and color-fading resistance of the composition.

The colored glass products according to the invention can be produced using the glass composition of the invention and conducting a conventional method for producing colored glass products. For example, the method is carried out by weighing the components to achieve the specified composition, mixing together the components, melting the mixture at a temperature of about 1200° to about 1500° C., stirring the molten mass, refining the mass, placing the resulting product into a mold, cooling the molded mass or heating the molded mass to about 450° to about 700° C. for about 1 to about 5 hours after cooling, and cutting, polishing and otherwise processing the molded product, whereby the desired glass product is obtained. The microcrystals of copper halide(s) are incorporated into the glass in the method by being mixed with the other components in the form of copper halide or alternatively in the form of a copper compound as the copper source such as copper oxide, copper halide and the like in combination with a halogenated alkali compound as the halogen source for producing a copper halide such as lithium halide, sodium halide, potassium halide, rubidium halide, cesium halide and the like in such a ratio as to achieve the defined composition. Usable as other components than copper halides are conventional glass components including oxides, carbonates, hydroxides and the like which eventually provide the intended composition. It is important to conduct the cooling and heating at a low rate to avoid thermal deformation. More specifically the cooling rate is about 10° to about 100° C./hr, preferably about 30° to about 50° C./hr, and the heating rate is about 10° to about 100° C./hr, preferably about 30° to about 70° C./hr. The size of microcrystals of copper halide is varied depending on the rates and the heating time. It is desirable in the invention to adjust the microcrystals of copper halide to a diameter of about 0.1 to about 10 nm. The melting step is preferably carried out in a inert or reducing atmosphere to convert Cu ions into Cu. A refiner such as $As_2O_3$, $Sb_2O_3$ or the like may be used in effecting the refining step.

The glass compositions of the invention have the following remarkable advantages:

(1) The glass materials of the invention can substantially completely intercept light beams at any wavelength of about 350 to about 450 nm within the range of 250 to 800 nm at which the beams have been irradiated, and substantially completely permit the passage of light beams at longer wavelength. In addition, the glass materials show a sharp inclination in the graph under JIS B 7113 and thus have an excellent absorbing characteristic.

(2) The glass materials which can intercept light beams at any wavelength of about 350 to about 450 nm can be produced by controlling the content, the kind, and the combination of copper halides to be incorporated into the glass.

(3) The light transmitting characteristic of the glass materials is not varied by irradiation with any of UV, visible and near-infrared light beams.

(4) Glass products can be prepared by common glass-producing equipment safely, unlike conventional colored glass, without care heretofore required in handling and disposal nor addition of installations for disposal and the like.

(5) The glass compositions of the invention can be easily melted and therefore give a glass product which has a uniform composition and stable properties.

Given below are Examples, Reference Examples and Test Examples to clarify the features of the present invention in greater detail.

EXAMPLES 1 TO 4 AND REFERENCE EXAMPLES 1 AND 2

The starting materials as shown below in Table 1 were mixed together in the listed amounts and the mixture was melted in a crucible made of alumina under the conditions as shown in Table 1, stirred and refined. The mixture was poured into a mold and cooled to room temperature, followed by heat treatment. The molded product was cut and polished to obtain a colored glass product.

In the above procedure, the mixture of the starting materials were melted in a inert or reducing atmosphere, cooled at a rate of 30° C./hr and heated for the heat treatment at a rate of 50° C./hr.

$Cu_2O$ was used as a copper source and sodium halide as a halogen source.

The mixtures of the listed compositions were melted and molded with ease, and the obtained glass products were all outstanding in chemical resistance. It was confirmed that even when $As_2O_3$ or $Sb_2O_3$ was used as a refiner in the refining step, the, light transmitting characteristic of the obtained glass products was not changed.

Table 1 also shows the results obtained using a hard glass product and a commercially available windowpane as Reference Examples 1 and 2.

TABLE 1

| Components (%) | Examples | | | | Reference Examples | |
|---|---|---|---|---|---|---|
| | 1 | 2 | 3 | 4 | 1 | 2 |
| $SiO_2$ | 75.0 | 62.0 | 62.0 | 20.0 | 70.0 | 71.6 |
| $P_2O_5$ | — | — | — | 22.0 | — | — |
| $B_2O_3$ | 15.0 | 21.0 | 20.0 | 21.0 | 14.4 | — |
| $Al_2O_3$ | 2.0 | 5.0 | 3.0 | 18.0 | 3.6 | 1.0 |
| $Na_2O$ | 6.0 | 10.0 | 10.0 | 14.0 | 8.5 | 13.3 |
| CaO | — | — | — | 3.0 | — | 9.8 |
| MgO | | | | | 2.3 | 4.3 |
| PbO | — | — | 3.0 | — | — | — |
| CuO | 1.0 | 1.0 | 1.0 | 1.0 | — | — |
| KBr | 1.0 | 1.0 | 1.0 | 1.0 | — | — |
| Melting temperature | 1450° C. | 1380° C. | 1350° C. | 1350° C. | 1450° C. | 1500° C. |
| Heat-treatment temperature | 630° C. | 580° C. | 580° C. | 550° C. | | |
| Heat-treatment time (hours) | 3 | 2 | 2 | 0.5 | | |
| Thermal expansion coefficient ($\times 10^{-7}$/°C.) | 55 | 65 | 70 | 70 | 57 | 85 |
| Softening temperature | 750° C. | 680° C. | 650° C. | 670° C. | 705° C. | 725° C. |
| Young's modulus | 9.6 | 9.8 | 9.8 | 9.7 | 9.7 | 10.0 |
| Knoop hardness | 500 | 480 | 470 | 490 | 520 | 540 |
| Poisson's ratio | 0.21 | 0.23 | 0.24 | 0.22 | 0.21 | 0.24 |
| Chemical property (JIS mgNa2O) | 0.06 | 0.09 | 0.09 | 0.08 | 0.07 | — |
| Remarks | For containers | For glass plates | For spectacles and optical materials | For glass plates | Hard glass | Commercially available windowpanes |

TEST EXAMPLE 1

(1) The glass product (thickness of 2 mm) obtained in Example 2 was tested for spectral transmitting characteristic by irradiation with light rays at a wavelength of 300 to 800 nm. FIG. 1 shows the results.

FIG. 1 shows that the UV-intercepting material of the present invention effectively intercepts light beams in ultraviolet region and has an excellent absorbing characteristic which is represented as a sharply inclined curve in the graph.

(2) The glass plates (thickness of 2 mm) obtained in Examples 1 to 4 were each irradiated with ultraviolet light for 2 hours at a position 10 cm away from a 500 W ultra-high pressure mercury lamp used as the light source. Thereafter each glass plate was tested for spectral transmitting characteristic by irradiation with light rays at a wavelength of 300 to 800 nm. The curves for the the spectral transmittances obtained before and after the irradiation with ultraviolet light corresponded with each other. This indicates that the light transmitting characteristic of the UV-intercepting materials of the invention is not changed by irradiation with ultraviolet light because the materials of the invention are excellent in durability.

(3) The same test as above in item (1) was conducted using a commercially available material for brown glass ampules (thickness of 2 mm) and a commercially available material for emerald green containers (thickness of 10 mm) for beverages.

Figure 2:
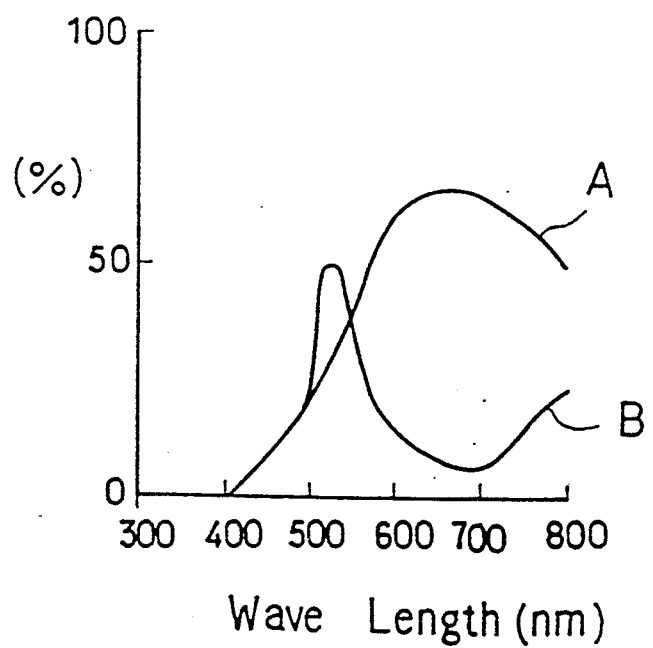
FIG. 2 shows the variation in graphs of light transmitting characteristics of two conventional colored glass products.

FIG. 2 shows the results as a curve A (a material for brown glass ampules) and as a curve B (a material for emerald green containers for beverages).

(4) The same test as in item (1) was carried out using a commercially available material for optical filters and for spectacle lenses (thickness of 2 mm).

Figure 3:
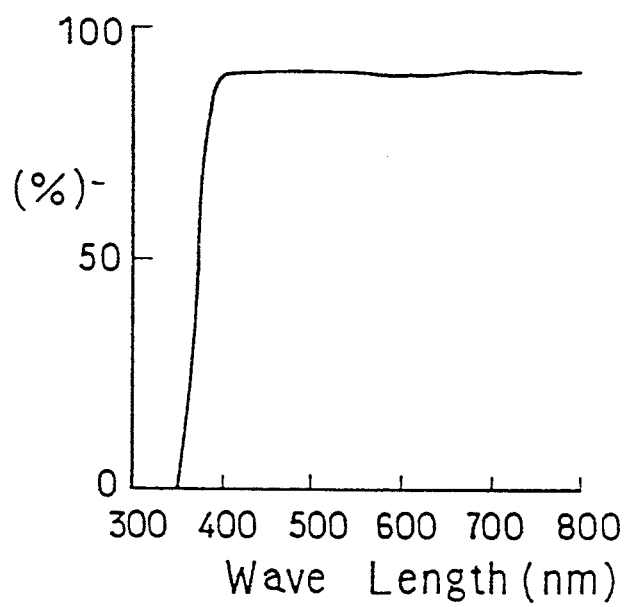
FIG. 3 is a graph showing the variation of light transmitting characteristic of a commercially available material for optical filters and spectacle lenses.

FIG. 3 shows the results.

(5) The same test as in item (1) was effected using a commercially available float glass plate (thickness of 2 mm).

Figure 4:
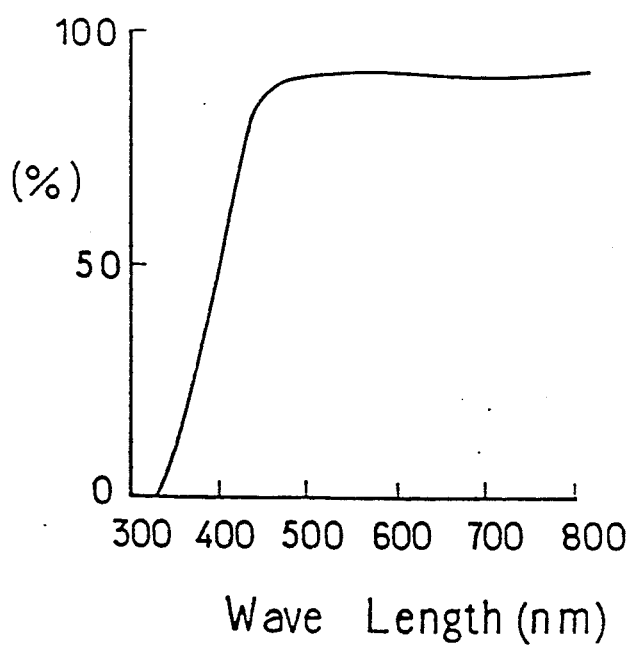
FIG. 4 is a graph showing the variation of light transmitting characteristic of a commercially available float glass plate.

FIG. 4 shows the results.

The results obtained above in items (1) to (5) reveal that the UV-intercepting materials of the invention have excellent characteristics.

TEST EXAMPLE 2

Figure 5:
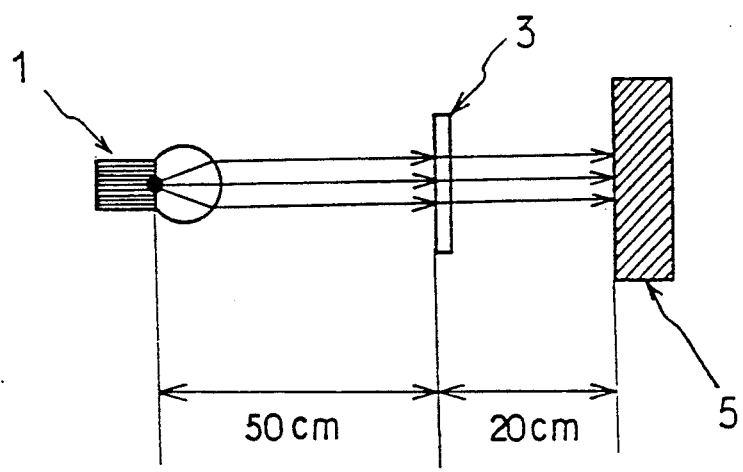
FIG. 5 is a sectional schematic view showing the related parts of an apparatus employed to measure the UV-intercepting ability of UV-intercepting material used in Test Example 2.

As shown in FIG. 5, a UV-intercepting material (3) having a thickness of 2 mm and obtained in one of Examples 1 to 3 was positioned at a distance of 50 cm from a 500 W ultraviolet lamp (1), and an object (5) was disposed at a distance of 20 cm from the material (3). Ultraviolet light was irradiated from the lamp (1). One thousand hours after the irradiation, the degree of discoloration of the object (5) was determined with use of a colorimeter to evaluate the effects achieved by the UV-intercepting material (3).

Table 2 shows the results.

TABLE 2

| UV-intercepting material | Object | Discoloration |
|---|---|---|
| Example 1 | Paint-coated plate | None |
| Example 2 | Painted picture | None |
| Example 3 | Polyethylene material | None |

The results shown in Table 2 demonstrate that the UV-intercepting materials of the present invention gave excellent effects.

EXAMPLES 5 TO 12

Glass products were produced in the same manner as in Example 1 with the exception of using the starting materials as shown below in Table 3.

TABLE 3

| Components (%) | Examples | | | | | | | |
|---|---|---|---|---|---|---|---|---|
| | 5 | 6 | 7 | 8 | 9 | 10 | 11 | 12 |
| $SiO_2$ | 67.3 | 53.0 | 70.5 | 61.7 | 52.5 | 62.0 | 56.5 | 67.7 |
| $B_2O_3$ | 12.6 | 20.8 | 13.8 | 16.0 | 26.1 | 17.8 | 16.8 | 23.1 |
| $Al_2O_3$ | 1.0 | 4.6 | — | 3.2 | 2.0 | — | 7.2 | — |
| $Li_2O$ | — | — | 0.5 | — | 0.5 | — | — | — |
| $Na_2O$ | 11.6 | 13.4 | 6.5 | 6.0 | 12.6 | 8.2 | — | 3.3 |
| $K_2O$ | 1.5 | — | 3.2 | 5.5 | — | 2.0 | 10.5 | 1.2 |
| $Rb_2O$ | | | | | — | 0.5 | — | — |
| $Cs_2O$ | | | | | — | — | 0.5 | — |
| MgO | 1.0 | — | — | — | | | | |
| CaO | 2.9 | — | 3.0 | — | — | — | 2.2 | — |
| ZnO | — | 1.2 | — | — | — | — | 2.2 | 1.1 |
| BaO | — | — | 0.5 | — | — | 5.0 | — | — |
| PbO | | | | | — | 2.0 | — | — |
| $Ta_2O_3$ | | | | | — | 0.5 | — | — |
| $Gd_2O_3$ | | | | | — | — | — | 0.5 |
| SrO | — | — | — | 1.0 | | | | |
| $ZrO_2$ | — | — | 0.5 | — | | | | |
| $La_2O_3$ | — | — | — | 0.5 | | | | |
| $Y_2O_3$ | — | — | — | — | | | | |
| CuCl | 2.1 | — | — | — | — | — | 3.1 | 3.1 |
| CuBr | — | 7.0 | — | 3.3 | — | 2.0 | 1.0 | — |
| CuI | — | — | 1.5 | 2.8 | 5.5 | — | — | — |
| Melting temperature | 1400° C. | 1380° C. | 1450° C. | 1400° C. | 1250° C. | 1400° C. | 1420° C. | 1450° C. |
| Heat-treatment temperature | 550° C. | 550° C. | 670° C. | 630° C. | 610° C. | 580° C. | 620° C. | 650° C. |
| Heat-treatment time | 2 hrs. | 0.5 hrs. | 5 hrs. | 3 hrs. | 0.1 hrs. | 2 hrs. | 3 hrs. | 2 hrs. |

TEST EXAMPLE 3

The spectral transmitting characteristics of the glass products obtained in Examples 5, 8 and 10 were determined by irradiation with light rays at a wavelength of 250 to 800 nm. FIG. 6 shows the curves for the spectral transmittance of the glass products. For comparison, FIG. 6 also shows the curves for the spectral transmittances of a conventional CdS-doped glass product and a conventional multilayer-coated glass product.

On the other hand, the glass plate (thickness of 2 mm) obtained in Example 5 was irradiated with ultraviolet light for 2 hours from a 500 W ultra-high pressure mercury lamp positioned 10 cm away as a light source. Thereafter the glass plate was tested for spectral transmitting characteristic by irradiation with light rays at a wavelength of 300 to 800 nm. The curves for the spectral transmittance obtained before and after the irradiation were found to correspond with each other. This indicates that the light transmitting characteristic of the foregoing glass plate used as a UV-intercepting material was not changed even when the glass plate was irradiated with ultraviolet light.

EXAMPLES 13 TO 20

Glass plates as UV-intercepting materials were produced in the same manner as in Example 1 with the exception of using mixtures of starting materials of the compositions as shown below in Table 4.

The mixtures were melted and molded with ease, and the obtained glass products were all outstanding in chemical resistance. Further it was confirmed that even when $As_2O_3$ or $Sb_2O_3$ was used as a refiner in the refining step, the light transmitting characteristic of the obtained glass products was not changed.

TABLE 4

| Components (%) | Examples | | | | | | | |
|---|---|---|---|---|---|---|---|---|
| | 13 | 14 | 15 | 16 | 17 | 18 | 19 | 20 |
| $SiO_2$ | 12.1 | 13.5 | 22.2 | 17.2 | 20.1 | 13.0 | 10.1 | 19.5 |
| $P_2O_5$ | 27.0 | 30.0 | 20.5 | 28.0 | 25.0 | 19.5 | 18.5 | 18.5 |
| $B_2O_3$ | 24.0 | 11.8 | 21.2 | 19.8 | 18.3 | 23.0 | 24.2 | 18.2 |
| $Al_2O_3$ | 17.0 | 23.1 | 13.8 | 17.7 | 21.1 | 21.3 | 23.5 | 15.6 |
| $Li_2O$ | — | 1.5 | — | — | — | — | — | — |
| $Na_2O$ | — | 12.7 | 14.0 | 7.0 | 10.3 | 3.0 | 10.5 | 15.0 |
| $K_2O$ | 13.1 | — | — | 4.1 | — | 6.2 | — | — |
| $Rb_2O$ | — | — | — | — | 0.2 | — | — | — |
| $Cs_2O$ | 1.0 | — | — | — | — | — | — | — |
| MgO | — | — | — | — | — | — | — | 3.2 |
| CaO | 1.3 | — | — | 1.9 | — | 7.8 | — | — |
| ZnO | — | 0.9 | — | — | 2.3 | — | 5.0 | — |
| BaO | 0.5 | — | — | — | — | 3.2 | — | 7.5 |
| SrO | — | 1.5 | — | — | — | — | — | — |
| PbO | — | — | — | — | — | — | 1.2 | — |
| $ZrO_2$ | — | — | — | 0.3 | — | — | — | — |
| $La_2O_3$ | — | — | 0.3 | — | — | — | — | — |
| $Y_2O_3$ | — | — | — | — | — | — | 0.5 | — |
| $Ta_2O_3$ | — | — | — | — | — | — | — | 0.5 |
| $Gd_2O_3$ | — | — | — | — | 0.5 | — | — | — |
| CuCl | 4.0 | — | — | 2.5 | — | 1.3 | — | — |
| CuBr | — | 3.2 | — | 1.5 | 2.2 | — | 3.5 | 2.0 |
| CuI | — | — | 8.0 | — | — | 1.2 | 3.5 | — |
| Melting temperature | 1350° C. | 1370° C. | 1350° C. | 1400° C. | 1420° C. | 1390° C. | 1380° C. | 1380° C. |
| Heat-treatment | 550° C. | 600° C. | 650° C. | 550° C. | 600° C. | 650° C. | 680° C. | 550° C. |

TABLE 4-continued

| Components | Examples | | | | | | | |
|---|---|---|---|---|---|---|---|---|
| (%) | 13 | 14 | 15 | 16 | 17 | 18 | 19 | 20 |
| temperature Heat-treatment time | 2 hrs. | 2 hrs. | 1 hrs. | 1 hrs. | 2 hrs. | 3 hrs. | 1 hrs. | 3 hrs. |

TEST EXAMPLE 4

The glass products obtained in Examples 13 and 16 were tested for spectral transmitting characteristics by irradiation with light rays at a wavelength of 250 to 800 nm. FIG. 7 shows the results together with the curve for the spectral transmittance of a conventional CdS-doped glass product for comparison.

The results in FIG. 7 demonstrate that the UV-intercepting materials of the invention effectively intercept light beams in ultraviolet region and have excellent absorbing characteristics which are represented as sharply inclined curves in the graphs.

The glass product obtained in Example 13 was irradiated with ultraviolet light for 2 hours from a light source 10 cm away (500 W ultra-high pressure mercury lamp). The glass product was tested for spectral transmitting characteristic by irradiation with light rays at a wavelength of 250 to 800 nm. The foregoing glass product of Example 13 showed a curve for the spectral transmittance which corresponded with that obtained by testing the glass product of Example 13 not irradiated with UV light. This indicates that the UV-intercepting materials of the invention, even when irradiated with ultraviolet light, exhibit substantially no change in light transmitting characteristic.

We claim:

1. A glass composition consisting essentially of about 8 to about 25% of $SiO_2$, about 5 to about 35% of $P_2O_5$, about 30% or less of $B_2O_3$, about 10 to about 35% of $Al_2O_3$, about 5 to about 20% of at least one of $Li_2O$, $Na_2O$, $K_2O$, $Rb_2O$ and $Cs_2O$, about 20% or less of at least one of MgO, CaO, ZnO, BaO, SrO and PbO, about 10% or less of at least one of $ZrO_2$, $La_2O_3$, $Y_2O_3$, $Ta_2O_3$ and $Gd_2O_3$, and about 0.05 to about 15% of at least one copper halide.

2. A glass composition according to claim 1 which consisting essentially of about 10 to about 20% of $SiO_2$, about 10 to about 30% of $P_2O_5$, about 10 to about 25% of $B_2O_3$, about 15 to about 25% of $Al_2O_3$, about 5 to about 15% of at least one of $Li_2O$, $Na_2O$, $K_2O$, $Rb_2O$ and $Cs_2O$, about 5% or less of at least one of MgO, CaO, ZnO, BaO, SrO and PbO, about 5% or less of at least one of $ZrO_2$, $La_2O_3$, $Y_2O_3$, $Ta_2O_3$ and $Gd_2O_3$, and about 0.3 to about 8% of at least one copper halide.

3. A glass composition according to claim 1 which intercepts light beams at less than a characteristic absorption wavelength within the range of 350 to 450 nm and substantially permits the passage of light beams at longer than said wavelength.

4. A process for selectively absorbing ultraviolet radiation, comprising
 (i) providing a glass composition according to claim 1 between an object sensitive to ultraviolet radiation and a light source which radiates light having wavelengths within the range of from 250 to 800 nm;
 (ii) intercepting light beams at less than a characteristic absorption wavelength within the range of 350 to 450 nm; and
 (iii) substantially completely permitting light beams at longer than said wavelength to pass through said glass composition and impinge upon said object.

* * * * *